(12) United States Patent
Yamade

(10) Patent No.: US 11,246,373 B2
(45) Date of Patent: Feb. 15, 2022

(54) SHOE SOLE MEMBER AND SHOE

(71) Applicant: ASICS CORPORATION, Hyogo (JP)

(72) Inventor: Takashi Yamade, Hyogo (JP)

(73) Assignee: ASICS CORPORATION, Hyogo (JP)

( * ) Notice: Subject to any disclaimer, the term of this patent is extended or adjusted under 35 U.S.C. 154(b) by 20 days.

(21) Appl. No.: 16/482,242

(22) PCT Filed: Jan. 31, 2018

(86) PCT No.: PCT/JP2018/003235
§ 371 (c)(1),
(2) Date: Jul. 30, 2019

(87) PCT Pub. No.: WO2018/143281
PCT Pub. Date: Aug. 9, 2018

(65) Prior Publication Data
US 2020/0046067 A1 Feb. 13, 2020

(30) Foreign Application Priority Data

Jan. 31, 2017 (WO) .................. PCT/JP2017/003415

(51) Int. Cl.
*A43B 13/04* (2006.01)
*C08J 9/00* (2006.01)

(52) U.S. Cl.
CPC ............. *A43B 13/04* (2013.01); *C08J 9/0061* (2013.01); *C08J 2207/00* (2013.01); *C08J 2300/22* (2013.01); *C08J 2300/26* (2013.01); *Y10T 428/249986* (2015.04)

(58) Field of Classification Search
CPC ......... A43B 13/04; C08J 9/0061; C08J 9/228; Y10T 428/249986
See application file for complete search history.

(56) References Cited

U.S. PATENT DOCUMENTS

| 4,818,785 A * | 4/1989 | Otawa ................... C08F 255/06 524/536 |
| 6,106,952 A * | 8/2000 | Yamashita .............. C08L 53/02 428/425.8 |
| 6,451,419 B1 | 9/2002 | Tsurugai et al. |

(Continued)

FOREIGN PATENT DOCUMENTS

| CN | 1902269 | 1/2007 |
| EP | 1880625 | 1/2008 |

(Continued)

OTHER PUBLICATIONS

"Notification Concerning Transmittal of International Preliminary Report on Patentability (Form PCT/IB/326) dated Aug. 15, 2019, and International Preliminary report on patentability (Form PCT/IB/373) dated Aug. 6, 2019, which includes English translation of Written Opinion of PCT/JP2018/003235", pp. 1-18.

(Continued)

*Primary Examiner* — Hai Vo
(74) *Attorney, Agent, or Firm* — JCIPRNET

(57) ABSTRACT

Provided is a shoe sole member partially or entirely made of a resin composite in which a plurality of resin foam particles, and one or a plurality of non-foamed elastic bodies having an initial elastic modulus at 23° C. being smaller than that of the resin foam particles are integrated together. Also provided is a shoe including the shoe sole member.

12 Claims, 3 Drawing Sheets

(56) References Cited

U.S. PATENT DOCUMENTS

| | | |
|---|---|---|
| 8,961,844 B2 | 2/2015 | Baghdadi et al. |
| 9,449,735 B2 | 9/2016 | Chiba et al. |
| 9,682,522 B2 | 6/2017 | Baghdadi et al. |
| 9,781,974 B2 | 10/2017 | Reinhardt et al. |
| 9,788,598 B2 | 10/2017 | Reinhardt et al. |
| 9,788,606 B2 | 10/2017 | Reinhardt et al. |
| 9,795,186 B2 | 10/2017 | Reinhardt et al. |
| 9,820,528 B2 | 11/2017 | Reinhardt et al. |
| 9,930,928 B2 | 4/2018 | Whiteman et al. |
| 2008/0229622 A1 | 9/2008 | Mori et al. |
| 2010/0047550 A1 | 2/2010 | Prissok et al. |
| 2011/0265351 A1 | 11/2011 | Mori et al. |
| 2013/0291409 A1 | 11/2013 | Reinhardt et al. |
| 2013/0318835 A1 | 12/2013 | Mutsuda et al. |
| 2014/0017450 A1 | 1/2014 | Baghdadi et al. |
| 2014/0097389 A1 | 4/2014 | Chiba et al. |
| 2014/0221517 A1 | 8/2014 | Shima et al. |
| 2014/0223777 A1 | 8/2014 | Whiteman et al. |
| 2014/0275306 A1* | 9/2014 | Watkins ............... C08J 9/009 521/137 |
| 2014/0366403 A1 | 12/2014 | Reinhardt et al. |
| 2014/0366404 A1 | 12/2014 | Reinhardt et al. |
| 2014/0366405 A1 | 12/2014 | Reinhardt et al. |
| 2015/0128359 A1 | 5/2015 | Baghdadi et al. |
| 2015/0252163 A1 | 9/2015 | Prissok et al. |
| 2016/0128426 A1 | 5/2016 | Reinhardt et al. |
| 2016/0227876 A1 | 8/2016 | Le et al. |
| 2017/0072599 A1* | 3/2017 | Huang ................. C08J 9/141 |
| 2017/0283575 A1 | 10/2017 | Akuta et al. |
| 2018/0035755 A1 | 2/2018 | Reinhardt et al. |
| 2018/0155518 A1 | 6/2018 | Koshita et al. |
| 2018/0206591 A1 | 7/2018 | Whiteman et al. |
| 2018/0251621 A1* | 9/2018 | Prissok ............... B29C 35/0805 |

FOREIGN PATENT DOCUMENTS

| | | |
|---|---|---|
| JP | S52137954 | 10/1977 |
| JP | S60042432 | 3/1985 |
| JP | 2013220354 | 10/2013 |
| JP | 2014077045 | 5/2014 |
| JP | 2014151210 | 8/2014 |
| JP | 2015523251 | 8/2015 |
| JP | 2015213096 | 11/2015 |
| JP | 2016141153 | 8/2016 |
| JP | 2016190989 | 11/2016 |
| WO | 9806777 | 2/1998 |
| WO | 2013031417 | 3/2013 |
| WO | 2013172449 | 11/2013 |
| WO | 2016052112 | 4/2016 |
| WO | 2016194737 | 12/2016 |

OTHER PUBLICATIONS

"International Search Report (Form PCT/ISA/210) of PCT/JP2018/003235," dated Mar. 13, 2018, with English translation thereof, pp. 1-4.

"Search Report of Europe Counterpart Application", dated Dec. 18, 2019, p. 1-p. 7.

"Office Action of China Counterpart Application", dated Oct. 26, 16, 2020, with English translation thereof, pp. 1-15.

* cited by examiner

SHOE SOLE MEMBER AND SHOE

CROSS-REFERENCE TO RELATED APPLICATION

This application is a 371 application of the International PCT application ser. no. PCT/JP2018/003235, filed on Jan. 31, 2018, which claims priority benefits of International PCT application ser. No. PCT/JP2017/003415, filed on Jan. 31, 2017. The entirety of the above-mentioned patent application is hereby incorporated by reference herein and made a part of this specification.

TECHNICAL FIELD

The present invention relates to a shoe sole member and a shoe, and more specifically, to a shoe sole member that is partially or entirely formed of a foam product in which a plurality of resin foam particles are integrated, and a shoe including the shoe sole member.

BACKGROUND

Shoe sole members are required to have excellent cushioning properties. Generally, a foam product is used as a material for the shoe sole members that satisfy such requirements. For example, Patent Literatures 1 and 2 disclose shoe sole members composed of a foam product formed by welding a plurality of foam particles.

In the shoe sole member using the foam product, the cushioning properties of the shoe sole member can be effectively enhanced by increasing the expansion ratio of the foam product. Further, due to the low initial stiffness of the foam product of high expansion ratio, shoes including such a foam product as the shoe sole member have soft and comfortable wearing feeling when the foot fits in the shoe.

A material having a low stiffness (being soft) and high cushioning properties is usually deformed greatly when subjected to a load. Therefore, shoes that include a foam product of a high expansion ratio as the shoe sole member as described above may be excessively deformed when subjected to a high load. In this case, there are problems that the deformation greatly impairs agility and increases the risk of injury to the wearer. Especially, sports shoes such as basketball shoes and running shoes, of which the shoe soles are liable to be subjected to a high load, are required to include a shoe sole member having a relatively small amount of strain (amount of deformation) when subjected to a high load.

When the expansion ratio of the foam product in the shoe sole member is made low, the amount of strain of the shoe sole member becomes relatively small, but there is a problem that the cushioning properties of the shoe sole member are also lowered in normal use when the shoe sole member is not subjected to a high load. Further, since the stiffness of the foam product is high, the shoe including the shoe sole member has a problem of causing hard wearing feeling when the foot fits into the shoe.

CITATION LIST

Patent Literature

Patent Literature 1: JP-2013-220354 A
Patent Literature 2: JP-2014-151210 A

SUMMARY

Technical Problem

In view of the abovementioned problems, it is an object of the present invention to provide a shoe sole member that exhibits soft wearing feeling when the foot fits in the shoe provided with the shoe sole member and that can exhibit high cushioning properties while suppressing excessive deformation when provided in the shoe, and a shoe including such a shoe sole member.

Solution to Problem

The present inventors have found that the above problems can be solved by using a resin composite in which an elastomer having a relatively low elastic modulus is dispersed among a plurality of resin foam particles.

That is, a shoe sole member according to the present invention is partially or entirely made of a resin composite in which a plurality of resin foam particles, and one or a plurality of non-foamed elastic bodies having an initial elastic modulus at 23° C. being smaller than that of the resin foam particles are integrated together.

In the shoe sole member according to the present invention, it is preferable that the plurality of non-foamed elastic bodies be included, and the resin composite be formed with the plurality of non-foamed elastic bodies dispersed in a matrix composed of the plurality of resin foam particles.

In the shoe sole member according to the present invention, it is preferable that the resin composite be formed with the plurality of resin foam particles dispersed in a matrix composed of the one or the plurality of non-foamed elastic bodies.

In the shoe sole member according to the present invention, it is preferable that the plurality of resin foam particles be made of a resin composition including a polyamide elastomer.

In the shoe sole member according to the present invention, it is preferable that the plurality of resin foam particles be made of a resin composition including an olefin elastomer.

In the shoe sole member according to the present invention, it is preferable that the plurality of resin foam particles be made of a resin composition including a urethane elastomer.

In the shoe sole member according to the present invention, it is preferable that the one or the plurality of non-foamed elastic bodies be made of a resin composition including a styrene-ethylene-butylene-styrene block copolymer.

A shoe according to the present invention includes the abovementioned resin composite.

DESCRIPTION OF EMBODIMENTS

Hereinafter, an embodiment of a shoe sole member and a shoe of the present invention will be described with reference to the drawings. The following embodiments are shown merely as examples. The present invention is not limited to the following embodiments at all.

Figure 1:
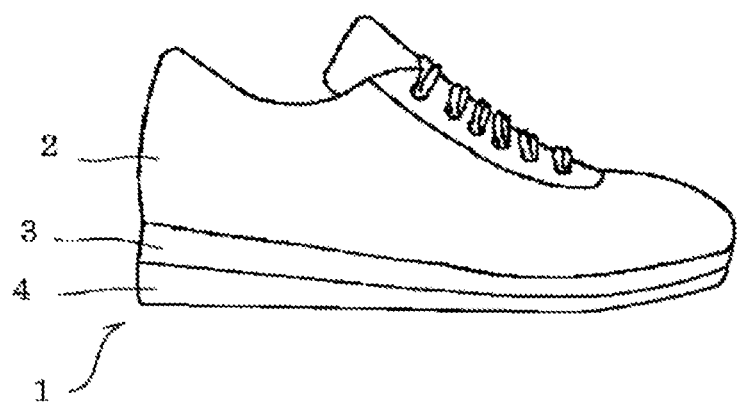
FIG. 1 is a schematic view showing a shoe in which a shoe sole member of one embodiment is used.

FIG. 1 shows a shoe including a shoe sole member of this embodiment. The shoe 1 includes an upper member 2 covering an upper side of a foot, and shoe sole members 3 and 4 disposed on a lower side of the upper member 2 to form a shoe sole. The shoe 1 includes, as the shoe sole members, an outer sole 4 disposed at a position to engage with the ground, and a midsole 3 disposed between the upper member 2 and the outer sole 4.

The shoe sole member of this embodiment is partially or entirely made of a resin composite in which a plurality of resin foam particles, and one or a plurality of non-foamed elastic bodies having an initial elastic modulus at 23° C. being smaller than that of the resin foam particles are integrated together. Specifically, the shoe sole member of this embodiment is partially or entirely made of a resin composite that includes a foam product that is a matrix formed with a plurality of resin foam particles integrated together, and a non-foamed elastic body dispersed in the foam product and has an initial elastic modulus at 23° C. being smaller than that of the foam product. With such a configuration, the shoe sole member has a relatively small initial stiffness, a relatively large amount of strain during normal use, and a relatively small amount of strain at a high load. Therefore, the shoe including the shoe sole member exhibits soft wearing feeling when the foot fits in the shoe, and can exhibit high cushioning properties while suppressing excessive deformation. Here, the high-load state of the shoe sole member means the state where it is subjected to stress of approximately 0.6 to 1.0 MPa. In this description, the elastic modulus (Young's modulus) of the resin composition or the like means compression elastic modulus at 23° C. More specifically, it means a value obtained by measurement under the conditions in the Examples to be described later.

For example, in the shoe 1 of this embodiment, both the midsole 3 and the outer sole 4 may be formed of the resin composite, or any one of the midsole 3 and the outer sole 4 may be formed of the resin composite.

The midsole 3 or the outer sole 4 may be partially formed of the resin composite. Preferably, in the shoe 1 of this embodiment, at least the midsole 3 may be partially or entirely formed of the resin composite.

(Foam Product)

The foam product included in the resin composite of this embodiment is formed with a plurality of resin foam particles integrated together. In this description, the resin foam particles mean foam particles composed of a resin composition and having a plurality of voids in the resin composition.

The plurality of resin foam particles may be composed of any resin composition capable of being made into resin foam particles. For example, the resin composition may be polyether block amide (PEBA), polyesters (PEs), ethylene vinyl acetate (EVA), thermoplastic urethane (TPU), polyamide (PA), polyethylene (PE), polypropylene (PP), polystyrene (PS), or ethylene-propylene rubber (EPDM), and preferably polyether block amide (PEBA), thermoplastic urethane (TPU), or polyethylene (PE). These resin compositions may be individually used, or two or more of them may be used in combination.

Preferably, the resin composition includes a polyamide elastomer. In this case, the shoe sole member of this embodiment can have a suitable stiffness and a suitable lightweight property as the shoe sole member. Preferably, the resin composition includes an olefin elastomer or a urethane elastomer. In this case, the shoe sole member of this embodiment can be manufactured at a relatively low cost.

The polyamide elastomer included in the resin composition is not particularly limited, but is preferably a polyether block amide (PEBA) having a hard segment composed of polyamide units and a soft segment composed of polyether units. The polyamide units constituting the hard segment may be, for example, polyamide 6, polyamide 66, polyamide 11, polyamide 12, polyamide 610, polyamide 612, or the like, and polyamide 11 or polyamide 12 is more preferable. These polyamide units may be individually used, or two or more of them may be used in combination. The polyether units constituting the soft segment may be, for example, polyethylene ether glycol, polypropylene ether glycol, polytetramethylene ether glycol, polyhexamethylene ether glycol, or the like, and polytetramethylene ether glycol is more preferable. These kinds of polyether units may be individually used, or two or more of them may be used in combination.

The resin composition may include any other resin composition, and may further include chemicals such as pigments, antioxidants, and ultraviolet absorbers.

The plurality of resin foam particles can be made from the resin composition using a conventionally known method. Specifically, the foamed resin particles constituting the resin foamed particles may be made by, for example, an impregnation method in which resin particles free from foaming agents are made, followed by impregnation of the resin particles with a foaming agent, or an extrusion method in which a resin composition including a foaming agent is extruded into cooling water for granulation. In the impregnation method, the resin composition is first molded to make resin particles. Next, the resin particles, a foaming agent, and an aqueous dispersant are introduced into an autoclave, followed by stirring under heat and pressure, to impregnate the resin particles with the foaming agent. The foaming agent with which the resin particles are impregnated is caused to foam to obtain the resin foam particles. In the extrusion method, for example, the resin composition and a foaming agent are added into an extruder equipped with a die having many small holes at its tip, followed by melt-kneading. The molten-kneaded product is extruded from the die into the form of strands and thereafter is immediately introduced into cooling water to be cured. The thus obtained cured material is cut into a specific length to obtain the resin foam particles.

The foaming agent used in the aforementioned methods is not particularly limited and may be, for example, a chemical foaming agent or a physical foaming agent. The chemical foaming agent is a foaming agent that generates a gas by chemical reaction or pyrolysis. Examples of the chemical foaming agent include inorganic chemical foaming agents such as sodium bicarbonate and ammonium carbonate, and organic chemical foaming agents such as azodicarbonamide. The physical foaming agent is, for example, a liquefied gas or a supercritical fluid, and is foamed by pressure reduction or heating. Examples of the physical foaming agent include aliphatic hydrocarbons such as butane, alicyclic hydrocarbons such as cyclobutane, and inorganic gases such as carbon dioxide gas, nitrogen, and air.

In this embodiment, in order to make the foamed resin particles, an impregnation method using a supercritical fluid for foaming the resin composition is particularly preferably used. In this case, the resin composition can be dissolved in the supercritical fluid at a comparatively low temperature, and therefore the need for a high temperature for melting the resin composition is eliminated. This is particularly advantageous when the resin composition includes a resin with a high melting point, such as a polyamide elastomer. Further, the method is advantageous also in that generation of toxic gases due to foaming of a chemical foaming agent is suppressed since no chemical foaming agent is used.

The density and the expansion ratio of the plurality of resin foam particles are not particularly limited.

The shape and the size of the plurality of resin foam particles are not particularly limited. The shape of the resin foam particles is preferably spherical. In this case, the volume-average particle size $D_{50}$ (median diameter) of the resin foam particles may be preferably in a diameter range of 1 to 20 mm, more preferably in a diameter range of 2 to 10 mm. In this description, the particle size of the resin foam particles means a value obtained by measuring the long diameter of each of the particles using a microscope.

The foam product is formed with the plurality of resin foam particles integrated by hot pressing, a vapor method, or the like. The foam product can be formed with the elastic body dispersed therein by integrating the plurality of resin foam particles in the state where the plurality of resin foam particles and the elastic body are mixed together, as will be described later.

The foam product has an initial elastic modulus at 23° C. being equal to or greater than that of the elastic body. The initial elastic modulus of the elastic body at 23° C. is preferably 0.3 MPa or more and 20 MPa or less, more preferably 0.5 MPa or more and 10 MPa or less. In this case, the initial stiffness and the amount of strain of the resin composite can be set to values more suitable for the shoe sole member. The initial elastic modulus of the form product included in the resin composite can be measured by cutting out a foam portion with no elastic body included from the resin composite to obtain a test piece, and measuring the initial elastic modulus of the test piece. Here, the initial elastic modulus of the foam product can be regarded as the initial elastic modulus of the resin foam particles.

(Elastic Body)

The resin composite of this embodiment has a plurality of elastic bodies dispersed among the plurality of resin foam particles in a matrix composed of the foam product. The elastic body has an elastic modulus lower than that of the foam product. Specifically, the initial elastic modulus at 23° C. of the elastic body is lower than the initial elastic modulus at 23° C. of the foam product. The initial elastic modulus of the elastic body at 23° C. is preferably 0.1 MPa or more and 5 MPa or less, more preferably 0.2 MPa or more and 2 MPa or less. When the initial elastic modulus of the elastic body at 23° C. is less than 0.1 MPa, the shoe sole member including the elastic body may have insufficient durability and mechanical strength. According to the above ranges, the initial stiffness and the amount of strain of the resin composite can be set to values more suitable for the shoe sole member.

The elastic body is preferably made of an elastomer having a relatively low elastic modulus. In this description, the elastic body made of an elastomer generally includes 10% or more (by weight) of the resin component relative to the component constituting the elastomer. Preferably, a styrene resin, a polyolefin resin, or a urethane resin can be used as the resin component. The styrene resin may be, for example, styrene-ethylene-butylene-styrene block copolymer (SEBS), styrene-butadiene-butylene-styrene block copolymer (SBBS), hydrogenated polystyrene-poly(styrene-butadiene)-polystyrene (SSEBS), styrene-butylene-styrene block copolymer (SBS), styrene-isoprene block copolymer (SIS), styrene-ethylene-propylene-styrene block copolymer (SEPS), or the like, and SEBS, SSEBS, or SIS is more preferable. The polyolefin resin may be low density polyethylene, medium density polyethylene, ethylene-alpha olefin copolymer, ethylene-propylene rubber, polypropylene, ethylene-vinyl acetate, ethylene-acrylic acid copolymer, or the like, and ethylene-alpha olefin copolymer is more preferable. The urethane resin may be, for example, thermoplastic urethane, thermosetting urethane, or the like, and thermoplastic urethane is more preferable. These resins may be individually used, or two or more of them may be used in combination.

In the case where the elastomer includes a styrene resin, the initial elastic modulus of the elastomer can be adjusted to an appropriate value by appropriately adjusting the content of the styrene component (styrene content) in the styrene resin. Thereby, the initial stiffness and the amount of strain of the shoe sole member can be adjusted to appropriate values.

The elastomer may further include a plasticizer, which may be, for example, paraffinic, naphthenic, aromatic, olefinic, or the like, with paraffinic being more preferred.

The elastic body may include any component other than the main component resin of the elastic body, and may further include chemicals such as pigments, antioxidants, and ultraviolet absorbers.

The amount of the resin component included in the elastic body is preferably 10% by weight or more, more preferably 20% by weight or more, still more preferably 30% by weight or more, and most preferably 40% by weight or more with respect to the entire composition constituting the elastic body.

The elastic body is a non-foam product, unlike the foam product. Thus, the elastic body can have a relatively high density. As a result, the resin composite can effectively exhibit its characteristics that it has a small amount of strain at a high load. In addition, use of the non-foamed elastic body also brings an advantage that shrinkage of the resin foam particles, which may occur when a plurality of materials with different degrees of foaming are mixed and hot pressed, does not occur at the time of molding the resin composite, which will be described later.

(Resin Composite)

The resin composite of this embodiment is formed with the elastic body dispersed in a matrix composed of the foam product. Specifically, it is formed with a plurality of the non-foamed elastic bodies dispersed among the plurality of resin foam particles in the matrix composed of the foam product. Therefore, the shoe sole member formed of the resin composite of this embodiment can exhibit not only lightweight properties but also soft wearing feeling when the foot fits in the shoe, excessive deformation suppression, and cushioning properties, as compared with a conventional shoe sole member formed of a resin foam product that does not include elastic bodies. The volume ratio of the elastic bodies and the resin foam particles included in the resin composite is preferably set so that the amount of the resin foam particles is larger than the amount of the elastic bodies.

In this case, the shoe sole member can more effectively exhibit the abovementioned characteristics of the resin composite.

The resin composite is obtained by mixing the elastic bodies into a plurality of resin foam particles formed as described above, and then integrating the plurality of resin foam particles having the elastic bodies mixed therewith. The method for integrating the plurality of resin foam particles having the elastic bodies mixed therewith can be, for example, hot pressing the plurality of resin foam particles having the elastic bodies mixed therewith, within a forming mold using a heat press machine, or welding the plurality of resin foam particles and the elastic bodies by a vapor method. By using such a method, the plurality of resin foam particles mixed with the elastic bodies can be integrated in one step.

The elastic bodies can preferably be formed into particles by a conventionally known method, and then mixed with the plurality of resin foam particles. The shape and the size of the elastic bodies formed into particles are not particularly limited.

The method for mixing the elastic bodies with the plurality of resin foam particles is not particularly limited, and the elastic bodies can be mixed with the plurality of resin foam particles by any method.

The temperature for the hot pressing is appropriately adjusted depending on the type of the resin composition constituting the plurality of resin foam particles and the type of the elastomer constituting the elastic bodies. For example, in the case where the resin foam particles are composed of a resin composition including PEBA and the elastic bodies are composed of an elastomer including SEBS, the plurality of resin foam particles mixed with the elastic bodies can be hot-pressed appropriately under pressure at a temperature within the range of 100 to 180° C.

In this embodiment, various resin composites having a wide range of physical properties can be obtained by appropriately adjusting the mixing ratio between the plurality of resin foam particles and the elastic bodies depending on the required initial stiffness and amount of strain, at the time of integrating the plurality of resin foam particles having the elastic bodies mixed therewith.

It is also possible that, before integrating the plurality of resin foam particles having the elastic bodies mixed therewith, the mixing ratio of the plurality of resin foam particles and the elastic bodies is separately adjusted for every given area according to the required initial stiffness and amount of strain, and then these resin foam particles are integrated to form a resin composite. For example, in the case where the plurality of resin foam particles having the elastic bodies mixed therewith are integrated by hot pressing, the mixing ratio of the elastic bodies in an area of the shoe sole member to which a relatively large load is likely to be applied, specifically, an area of the heel portion and the forefoot portion, may be made larger than the mixing ratio of the elastic bodies in other areas. The heel portion of the shoe sole member having a large mixing ratio of the elastic bodies can effectively exhibit the shock absorbing effect caused by the characteristics of the elastic bodies even in the case where the heel portion is subjected to a relatively large load when the wearer lands in the motion of various sports. In addition, the forefoot portion of the shoe sole member having a large mixing ratio of the elastic bodies suppresses excessive deformation of the shoe sole and thereby enables the wearer to smoothly transfer his or her body weight at the time of the wearer's cutting maneuvers. On the other hand, in an area of the shoe sole member to which a relatively large load is less likely to be applied, the mixing ratio of the elastic bodies may be made smaller than the mixing ratio of the elastic bodies in other areas. For example, the midfoot portion of the shoe sole member, which is less likely to be subjected to a large load, may have a certain degree of cushioning properties. Thus, the area of the midfoot portion may have a small mixing ratio of the elastic bodies, thereby making it possible to reduce the weight of the shoe sole member. As described above, the mixing ratio between the plurality of resin foam particles and the elastic bodies is adjusted for every given area, so that the resin composite of which the initial stiffness and the amount of strain are different for every given area can be formed.

In this embodiment, a binder may be appropriately used for integrating the plurality of resin foam particles having the elastic bodies mixed therewith. Examples of the binder include binders other than the foamed resin such as surface modifiers and urethane. These binders may be individually used, or two or more of them may be used in combination. Preferably, the binders may be used in hot-pressing the plurality of resin foam particles having the elastic bodies mixed therewith.

The resin composite of this embodiment has a relatively small initial stiffness, a relatively large amount of strain during normal use, and a small amount of strain at a high load. The initial stiffness and the amount of strain can be determined from a compressive stress-strain curve based on the method described in Examples below. The initial elastic modulus of the resin composite at 23° C. is preferably not more than 10 MPa, and more preferably not more than 5 MPa.

(Shoe Sole Member and Shoe)

The shoe sole members of this embodiment, and the shoes including the shoe sole members can be produced in the same manner as conventionally known methods for producing shoes. For example, a method for producing shoe sole members including the shoe sole members of this embodiment includes the following steps:

(a) a first step of producing each of the plurality of resin foam particles from a resin composition for resin foam particles by the abovementioned impregnation method, extrusion method, or the like;

(b) a second step of mixing the elastic bodies with the plurality of resin foam particles obtained in the first step;

(c) a third step of introducing the mixture into a forming mold, followed by hot-pressing the forming mold using a heat press machine, to obtain a resin composite in which the resin foam particles are integrated and the elastic bodies are dispersed; and (d) a fourth step of producing shoe sole members that are partially or entirely formed of the resin composite obtained in the third step.

According to such a method, in the third step, the plurality of first and second resin particles can be integrated in one step.

In the third step, the shoe sole member may be directly molded by hot pressing using a forming mold. In this case, shoe sole members that are entirely formed of the resin foam product can be directly produced, and therefore the fourth step can be omitted.

As described above, the shoe sole member of this embodiment is partially or entirely formed of a resin composite in which a plurality of resin foam particles are integrated with one or more non-foamed elastic bodies having an initial elastic modulus at 23° C. being smaller than that of the resin foam particles, and thus has a relatively small initial stiffness, a relatively large amount of strain during normal use, and a relatively small amount of strain at a high load. Therefore, the shoe provided with the shoe sole member exhibits soft wearing feeling when the foot fits in the shoe, and can exhibit high cushioning properties while suppressing excessive deformation. In addition, since the shoe of this embodiment includes the shoe sole member, the shoe exhibits soft wearing feeling when the foot fits in the shoe, and can exhibit high cushioning properties while suppressing excessive deformation.

The shoe sole member and the shoe according to the present invention are not limited to the configuration of the aforementioned embodiment. Further, the shoe sole member and the shoe according to the present invention are not limited to those having the aforementioned operational effects. Various modifications can be made to the shoe sole member and the shoe according to the present invention without departing from the gist of the present invention.

For example, the resin composite forming the shoe sole member in the aforementioned embodiment is obtained with the elastic bodies dispersed in a matrix of a foam product composed of the resin foam particles, but may conversely be obtained with a plurality of resin foam particles dispersed in a matrix composed of the elastic bodies. The shoe sole member formed of such a resin composite can achieve softer wearing feeling when the foot fits in the shoe and further suppress excessive deformation at a high load, as compared with a shoe sole member formed of a resin composite in which the elastic bodies are dispersed in a foam product composed of the resin foam particles. In this case, it is preferable that the volume ratio between the elastic bodies and the resin foam particles included in the resin composite be set so that the amount of the elastic bodies is larger than the amount of the resin foam particles. Thereby, the shoe sole member can more effectively exhibit the aforementioned characteristics of the resin composite.

Although detailed description beyond the above will not be repeated here, conventionally known technical matters on shoe sole members may be optionally employed in the present invention even if the matters are not directly described in the above.

EXAMPLES

Hereinafter, the present invention will be elucidated by way of specific examples and comparative examples of the present invention. However, the present invention is not limited to the following examples.

The following particulate raw materials were used as the resin compositions used in Examples 1 to 7 and Comparative Examples 1 to 8 to be described later:
Styrene-ethylene-butylene-styrene block copolymer (SEBS): Density of 0.9 g/cm$^3$
Thermoplastic polyurethane (TPU-1): Density of 1.07 g/cm$^3$
Thermoplastic polyurethane (TPU-2): Density of 1.17 g/cm$^3$
Materials for Resin Foam Particles
Polyether block amide (PEBA): PEBAX5533 manufactured by Arkema
Thermoplastic polyurethane (TPU-3)
(Physical Property Test of Resin Composition)

As a result of measurements, the initial elastic moduli of SEBS, TPU-1, and TPU-2 as above at 23° C. were 0.67 MPa, 7.6 MPa, and 1.1 MPa, respectively. The initial elastic moduli were calculated from the stress-strain curves respectively obtained by cutting SEBS, TPU-1, and TPU-2 into a cylindrical shape having a diameter of 29 mm and a height of 12 mm, and compressing the sample pieces using an autograph precision universal tester (product name "AG-50kNIS MS" manufactured by Shimadzu Corporation) at 23° C. and at a strain rate of 0.1 mm/sec.
(Production of Resin Particles)

The aforementioned resin composition raw materials were p articulated using the following devices to produce the respective resin particles with a particle size of 1.3 mm.
Extruder: Tandem type with a bore of 65 mm-50 mm
Granulating die: Provided with 40 nozzles with a diameter of 0.8 mm and a land length of 3.0 mm, and joined to the extrusion outlet of the extruder
Underwater hot cutter: Provided with a high-speed rotary cutter with 3000 rotations per minute having 8 blades in the circumferential direction, with the high-speed rotary cutter being in close contact with the nozzle outlets of the granulating die, and the diverter resin outlet of the underwater hot cutter being equipped with a diameter changing jig for diverter resin outlet (bore: 3 mm and land length: 15 mm)

Specifically, the resin composition was particulated as follows. First, the resin composition was fed into the extruder at a rate of 50 kg/hour, and the resin composition was heated and melt-kneaded. The resin composition was cooled on the extrusion outlet side of the extruder so that the temperature of the resin composition was reduced to 175° C. Subsequently, the resin composition within the extruder was extruded into a chamber, in which cooling water at 40° C. under a water pressure of 0.4 MPa was being circulated, through a granulating die maintained at 300° C. by a heater. Simultaneously with the extrusion, the resin composition extruded from the die was cut by the high-speed rotary cutter of the underwater hot cutter. The thus cut resin particles were taken out of the chamber, followed by dehydration and drying, to obtain spherical resin particles with a particle size of 1.3 mm.
(Production of Resin Foam Particles)
Resin Foam Particles a Resin foam particles A were produced as follows, using the resin particles composed of the PEBA raw material "PEBAX5533" produced by the aforementioned method. In an autoclave having an internal capacity of 5 L and equipped with a stirrer, 2.3 kg of the aforementioned resin particles, 2.3 kg of distilled water, 6.0 g of magnesium pyrophosphate and 0.3 g of sodium dodecylbenzenesulfonate as dispersion stabilizers, and 2.3 g of ethylene bis-stearic acid amide as a foam stabilizer were introduced, followed by stirring inside the autoclave at 320 rpm for suspension. Subsequently, the temperature inside the autoclave was raised to 110° C., thereafter 460 g of butane (isobutane:normal butane=35:65 (mass ratio)) as a foaming agent was injected into the autoclave, and the inside of the autoclave was maintained at 110° C. for 6 hours. Thereafter, the inside of the autoclave was cooled to 20° C., and then the resin particles within the autoclave were taken out. The taken-out resin particles were placed in the presence of steam at 130° C., thereby foaming the butane foaming agent with which the aforementioned resin particles were impregnated, to obtain resin foam particles A composed of PEBA.
Resin Foam Particles B Resin foam particles B composed of PEBA and having a different expansion ratio from that of the resin foam particles A were obtained in the same manner as that for the resin foam particles A, except that the amount of butane injected as the forming agent was reduced.
Resin Foam Particles C-F Resin foam particles C to F composed of PEBA and each having a different expansion rate from that of the resin foam particles A were obtained in the same manner as that for the resin foam particles A, except that different amounts of butane were injected as the foaming agent.
Resin Foam Particles G
Resin foam particles G were produced by a conventionally known method, using resin particles composed of the TPU-3 raw material as the resin particles.
(Production of Resin Composite)

Examples 1 to 6 and Comparative Examples 1 to 3

The resin foam particles A or B composed of PEBA in specific amounts shown in Table 1 below were introduced into a closed container. After nitrogen was injected into the closed container at a pressure of 0.5 MPaG, the inside of the closed container was allowed to stand at normal temperature over 6 hours. Thus, the resin foam particles were impregnated with nitrogen. The resin foam particles were taken out of the closed container, and thereafter mixed with the particulated elastic bodies in specific amounts shown in Table 1, to fabricate a mixed particles raw material. Subsequently, cavities of a forming mold were filled with the mixed particles raw material. The forming mold was heated by steam at 0.24 MPa for 35 seconds, thereby integrating the resin form particles to mold the resin composite. In the obtained resin composite, a foam product in which the resin foam particles were integrated was a continuous body as a whole, and the elastic bodies were scattered in the foam product. Thereafter, the resin composite was cut into a disk shape having a diameter of 29±1 mm and a thickness of 12±1 mm to obtain the test pieces of Examples 1 to 3.

Comparative Examples 4 to 7

The foam products were respectively molded by integrating the resin foam particles, and cut into a disk shape to obtain the test pieces of Comparative Examples 4 to 7, in the same manner as in Examples 1 to 6 and Comparative Examples 1 to 3 except that only one kind of the resin foam particles C to F was introduced, instead of the mixed particles raw material, into the closed container.

Example 7

The resin composite was formed and cut into a disk shape to obtain the test piece of Example 7 in the same manner as in Examples 1 to 6 and Comparative Examples 1 to 3 except that the resin foam particles G composed of TPU-3 were used instead of the resin foam particles A or B composed of PEBA.

Comparative Example 8

The foam product was molded by integrating the resin foam particles, and cut into a disk shape to obtain the test piece of Comparative Example 8 in the same manner as in Example 7 except that only the resin foam particles G were introduced, instead of the mixed particles raw material, into the closed container.
(Physical Property Test of Shoe-Sole Member)
Density Measurement
The densities (true densities) of the test pieces of Examples 1 to 7 and Comparative Examples 1 to 8 were measured by the underwater displacement method. The results are shown in Table 1.
For the resin composite test pieces of Examples 1 to 7, foam portions having a size of about 10 m×10 mm×2 mm and including no elastic bodies were cut out respectively from the test pieces to measure the densities thereof according to JIS K 7311: 1995 (underwater displacement). Then, the densities of the resin composite test pieces of Examples 1 to 6 were compared with the densities of the foam portions and the densities of the elastic bodies, to calculate the amounts (in volume %) of the elastic bodies included respectively in the resin composite test pieces of Examples 1 to 7. The results are shown in Table 1.
Measurement of Compressive Stress-Strain Curve
The compressive stress-strain curves of the test pieces of Examples 1 to 7 and Comparative Examples 1 to 8 were respectively obtained by cutting the foam products into a cylindrical shape having a diameter of 29 mm and a height of 12 mm, and compressing the sample pieces using an autograph precision universal tester (product name "AG-50kNIS MS" manufactured by Shimadzu Corporation) at 23° C. and at a strain rate of 0.1 mm/sec. The compressive stress-strain curves thus measured are shown in FIGS. 2 to 5. The initial elastic moduli $E_0$ (MPa) at 23° C., the compressive stresses $\sigma_{0.4}$ (MPa) at a strain of 0.4, and the strains $\varepsilon_1$ at a compressive stress of 1 MPa, of the test pieces of Examples 1 to 7 and Comparative Examples 1 to 8, which are obtained from the compressive stress-strain curves, are shown in Table 1.

TABLE 1

| | Foam particle type | Elastic body Type | Content (volume %) | Resin composite/Foam product Density (g/cm³) | $E_0$ (MPa) | $\sigma_{0.4}$ (MPa) | $\varepsilon_{1MPa}$ (—) |
|---|---|---|---|---|---|---|---|
| Ex. 1 | A | SEBS | 4 | 0.11 | 1.07 | 0.18 | 0.76 |
| Ex. 2 | A | SEBS | 8 | 0.14 | 1.06 | 0.19 | 0.75 |
| Ex. 3 | A | SEBS | 11 | 0.17 | 0.83 | 0.19 | 0.72 |
| C. Ex. 1 | A | TPU-1 | 7 | 0.15 | 1.19 | 0.24 | 0.69 |
| C. Ex. 2 | A | TPU-1 | 8 | 0.17 | 1.17 | 0.25 | 0.68 |
| C. Ex. 3 | A | TPU-1 | 11 | 0.19 | 1.15 | 0.27 | 0.65 |
| Ex. 4 | B | SEBS | 3 | 0.16 | 2.19 | 0.40 | 0.67 |
| Ex. 5 | B | SEBS | 6 | 0.19 | 1.75 | 0.35 | 0.68 |
| Ex. 6 | B | SEBS | 14 | 0.25 | 1.42 | 0.37 | 0.65 |
| C. Ex. 4 | C | — | — | 0.07 | 1.20 | 0.18 | 0.81 |
| C. Ex. 5 | D | — | — | 0.10 | 1.70 | 0.24 | 0.77 |
| C. Ex. 6 | E | — | — | 0.11 | 2.00 | 0.29 | 0.74 |
| C. Ex. 7 | F | — | — | 0.14 | 2.71 | 0.44 | 0.67 |
| Ex. 7 | G | TPU-2 | 8 | 0.32 | 1.24 | 0.40 | 0.61 |
| C. Ex. 8 | G | — | — | 0.29 | 1.43 | 0.43 | 0.61 |

Figure 2:
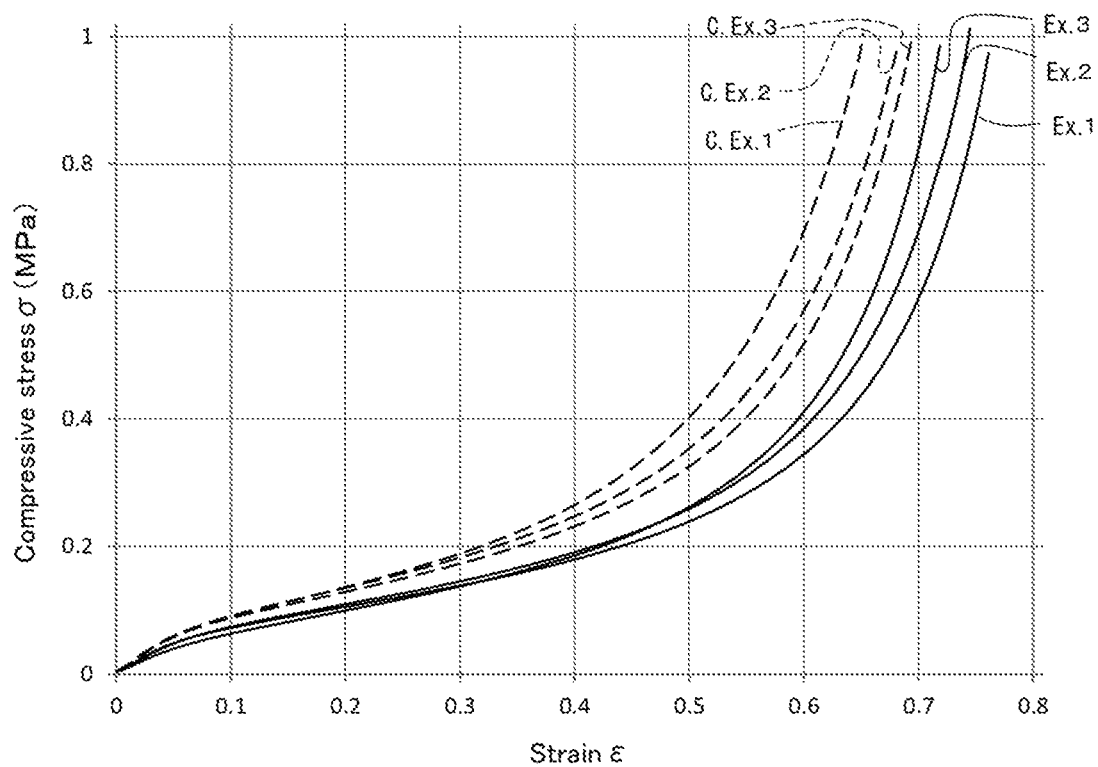
FIG. 2 is a graph showing the compressive stress-strain curves of foam products of Examples and Comparative Examples.
Figure 3:
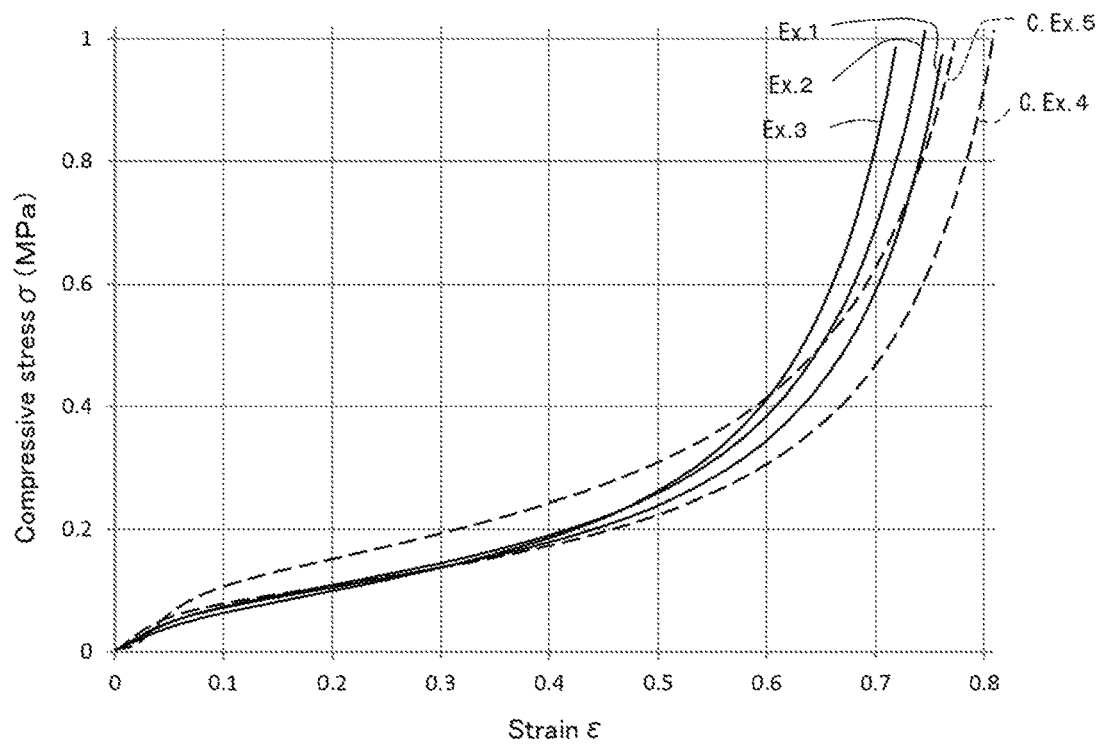
FIG. 3 is a graph showing the compressive stress-strain curves of foam products of Examples and Comparative Examples.
Figure 4:
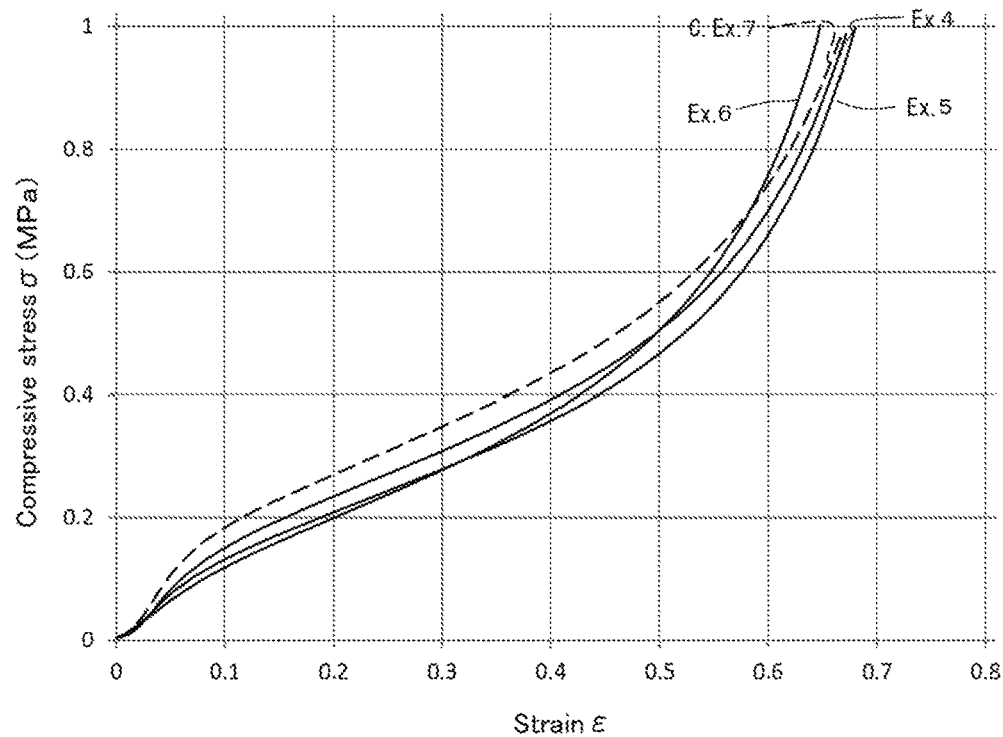
FIG. 4 is a graph showing the compressive stress-strain curves of foam products of Examples and Comparative Examples.
Figure 5:
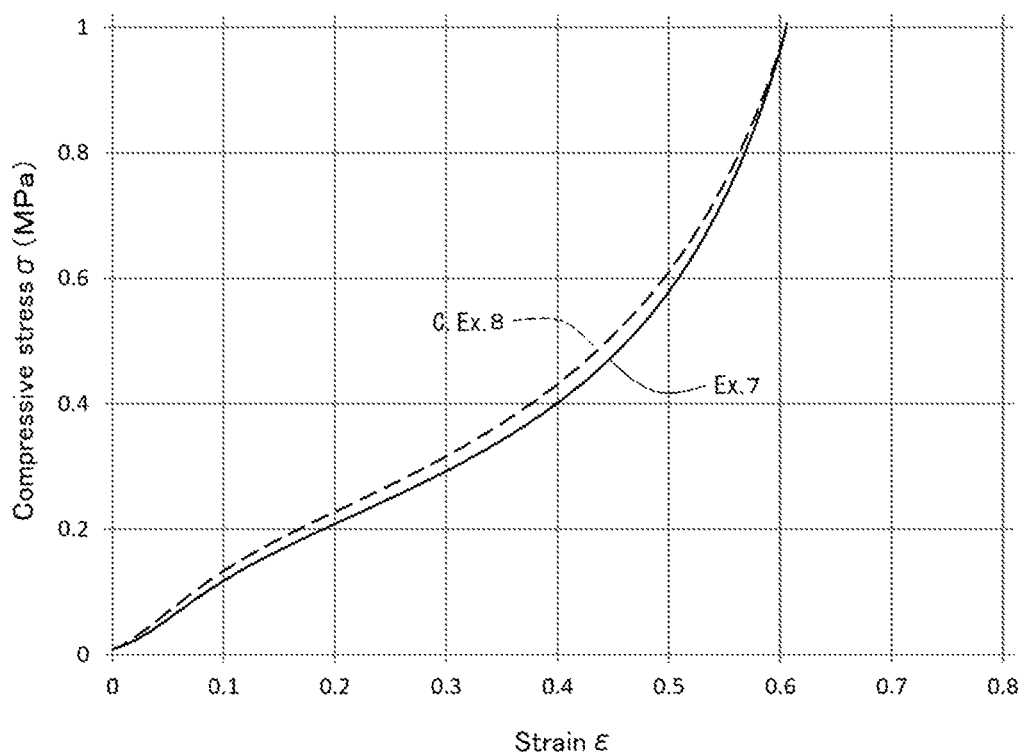
FIG. 5 is a graph showing the compressive stress-strain curves of foam products of an Example and a Comparative Example.

As is evident from Table 1 and FIGS. 2 to 4, the resin composites of Examples 1 to 3 each have an equivalent compressive stress $\sigma_{0.4}$ at a strain of 0.4 but a small initial stiffness $E_0$ and a relatively small strain $\varepsilon_1$ at a compressive stress of 1 MPa, as compared with the foam product of Comparative Example 4. Further, they each have a small initial stiffness $E_0$, a small compressive stress $\sigma_{0.4}$ at a strain of 0.4 (i.e., a large amount of strain is caused by a relatively small stress; that is, the amount of strain during normal use is relatively large), and a relatively small strain $\varepsilon_1$ at a compressive strain of 1 MPa, as compared with the foam product of Comparative Example 5. The resin composites of Examples 4 to 6 each have an equivalent strain $\varepsilon_1$ at a compressive stress of 1 MPa but a small initial stiffness $E_0$ and a small compressive stress $\sigma_{0.4}$ at a strain of 0.4, as compared with the foam product of Comparative Example 7. Similarly, the resin composite of Example 7 also has an equivalent strain $\varepsilon_1$ at a compressive stress of 1 MPa but a small initial stiffness $E_0$ and a small compressive stress $\sigma_{0.4}$ at a strain of 0.4, as compared with the foam product of Comparative Example 8. Thus, it is understood that the shoe provided with the resin composites of Examples 1 to 7 as a shoe sole member exhibits soft wearing feeling when the foot fits in the shoe, and exhibits high cushioning properties while suppressing excessive deformation. In contrast, the resin composites of Comparative Examples 1 to 3 where the elastic bodies composed of TPU having a higher elastic modulus than that of the foam product are dispersed in the foam product each have a large initial stiffness $E_0$ and a large compressive stress $\sigma_{0.4}$, as compared with Examples 1 to 3. Thus, it is understood that the shoe provided with these resin composites as a shoe sole member has hard wearing feeling when the foot fits in the shoe and poor cushioning properties during normal use, as compared with the shoe provided with the resin composites of Examples 1 to 3.

REFERENCE SIGNS LIST

1: Shoe
3: Midsole
4: Outer sole

The invention claimed is:

1. A shoe sole member, wherein the shoe sole member is partially or entirely formed of a resin composite in which a plurality of resin foam particles, and a plurality of non-foamed elastic bodies having an initial elastic modulus at 23° C. being smaller than that of the resin foam particles are integrated together, and the resin composite is formed with the plurality of non-foamed elastic bodies dispersed in a matrix composed of the plurality of resin foam particles,
wherein an amount of the plurality of non-foamed elastic bodies contained in the resin composite is 3% to 14% by volume with respect to the entire resin composite,
wherein the initial elastic modulus of the plurality of non-foamed elastic bodies is in the range of 0.1 MPa to 2 MPa,
wherein the plurality of non-foamed elastic bodies include: a resin component made of a polyolefin resin or a urethane resin; and a plasticizer which is paraffinic or naphthenic,
wherein the resin composite has an initial elastic modulus of 0.83-2.19 MPa,
wherein the resin composite has an initial elastic modulus of 10-39% lower than that of an identical resin composite having a plurality of non-foamed elastic bodies with an initial elastic modulus at 23° C. being greater than that of the resin foam particles, and
wherein the resin composite has a compressive stress $\sigma_{0.4}$ of 32-42% lower than that of an identical resin composite having a plurality of non-foamed elastic bodies with an initial elastic modulus at 23° C. being greater than that of the resin foam particles.

2. The shoe sole member according to claim 1, wherein the plurality of resin foam particles are made of a resin composition including a polyamide elastomer.

3. A shoe comprising the shoe sole member according to claim 2.

4. The shoe sole member according to claim 1, wherein the plurality of resin foam particles are made of a resin composition including an olefin elastomer.

5. A shoe comprising the shoe sole member according to claim 4.

6. The shoe sole member according to claim 1, wherein the plurality of resin foam particles are made of a resin composition including a urethane elastomer.

7. A shoe comprising the shoe sole member according to claim 6.

8. A shoe comprising the shoe sole member according to claim 1.

9. The shoe sole member according to claim 1, wherein the plurality of resin foam particles are made of a resin composition including one or more of polyether block amide (PEBA), polyesters (PEs), ethylene vinyl acetate (EVA), polyethylene (PE), and ethylene-propylene rubber (EPDM).

10. The shoe sole member according to claim 1, wherein the plurality of resin foam particles are made of a resin composition including a polyether block amide (PEBA) having a hard segment composed of polyamide units and a soft segment composed of polyether units.

11. The shoe sole member according to claim 1, wherein the plurality of resin foam particles are made of a resin composition including one or more of ethylene vinyl acetate (EVA), polyethylene (PE) and ethylene-propylene rubber (EPDM), and wherein the plurality of non-foamed elastic bodies include: the resin component made of a polyolefin resin and the plasticizer which is paraffinic or naphthenic.

12. The shoe sole member according to claim 1, wherein the plurality of resin foam particles are made of a resin composition including one or more of polyether block amide (PEBA), polyesters (PEs), and thermoplastic urethane (TPU), and wherein the plurality of non-foamed elastic bodies include: the resin component made of a urethane resin and the plasticizer which is paraffinic or naphthenic.

* * * * *